Figures 1, 2:
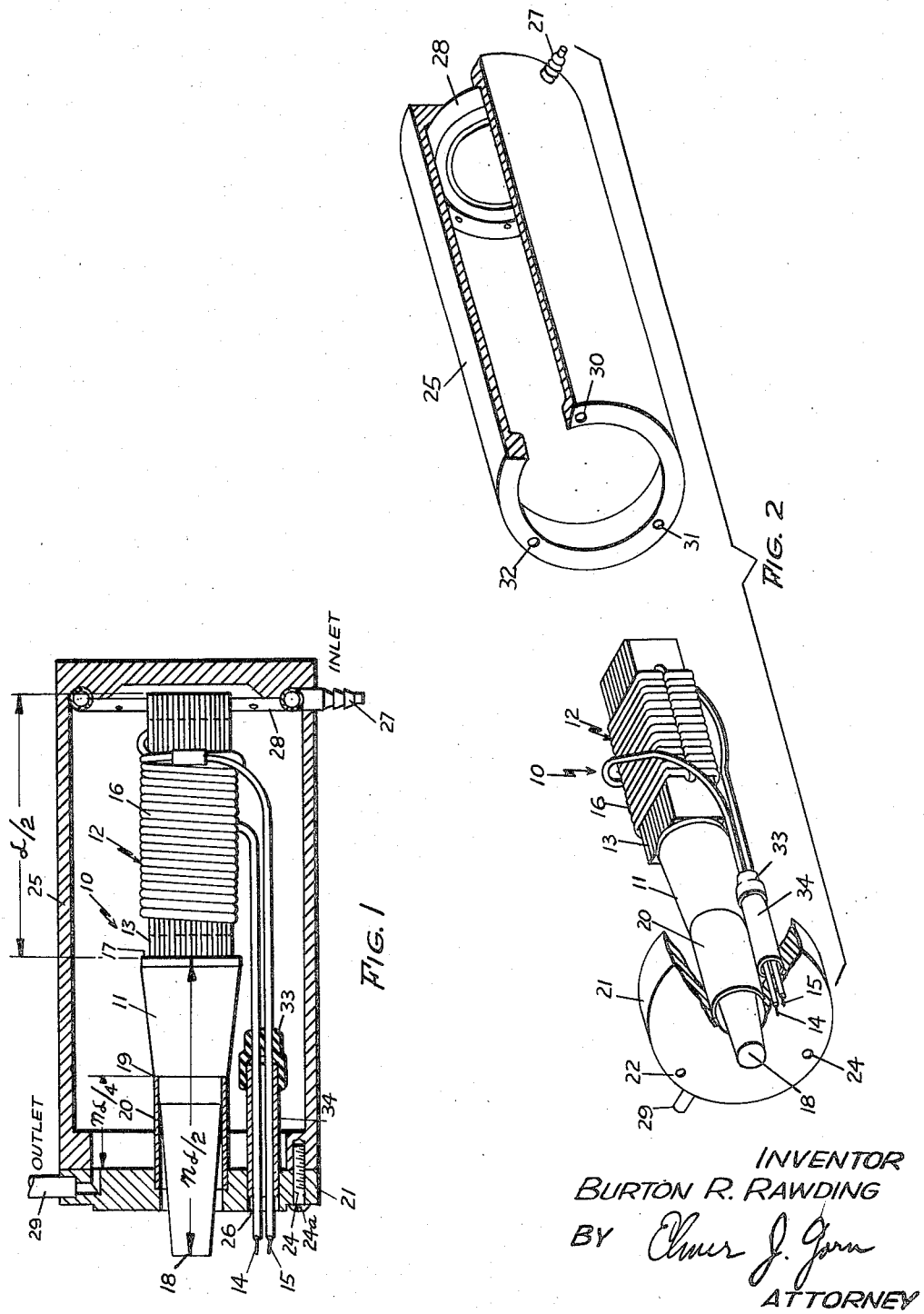

Dec. 30, 1958 B. R. RAWDING 2,866,911
SUPPORTS FOR VIBRATORY DEVICES
Filed Oct. 4, 1956

INVENTOR
BURTON R. RAWDING
BY
ATTORNEY

United States Patent Office 2,866,911
Patented Dec. 30, 1958

2,866,911

SUPPORTS FOR VIBRATORY DEVICES

Burton R. Rawding, Walpole, Mass., assignor to Raytheon Manufacturing Company, Waltham, Mass., a corporation of Delaware Application October 4, 1956, Serial No. 614,007

11 Claims. (Cl. 310—26)

This invention relates to magnetostrictive vibrator systems and, in particular, to support means for rigidly supporting a vibratory system in order to perform work.

The present invention is an improvement of a vibratory system characteristically similar to that disclosed in a United States Patent 2,632,858 to Carlo L. Calosi. As disclosed in the patent to Calosi, supporting the vibrating element of vibratory devices at a node of the vibratory element results in unsatisfactory operation of the device. In accordance with the present invention, a vibratory device is supported rigidly at a node of the vibrating element in a manner which results in not only satisfactory operation of the device without the inherent defects referred to in the aforementioned patent, but which is less complex and yet free of lateral movement. Accordingly, a rigid cylindrical sleeve is attached to the vibrating element, or transmitting cone, of the device substantially at a node of the longitudinal vibrations induced therein. The length of the sleeve is preferably selected to be substantially an odd integral number of quarter wavelengths of the vibratory frequency, and said sleeve is attached to said vibrating element at substantially a longitudinal node. The sleeve extends toward the tapered end of the vibrating element and is terminated by a ring having a large mass. Mounted on the ring is a housing for enveloping the vibratory system, and contained in said housing is the cooling system for the device.

The sleeve and the structures attached thereto are substantially free of longitudinal vibrations because of the attachment of the sleeve to the vibrating element at a longitudinal node. Radial vibrations at the node induce transverse waves in the sleeve, and, ostensibly, it would be expected that the sleeve would be subjected to stresses and the device subject to loss of energy and lateral movement. The present invention is not subject to the ostensible defects described. One seemingly plausible explanation of the invention is that radial waves in the sleeve travel transversely the length of the sleeve, only to be reflected back by the large mass of the ring attached thereto. Due to this phenomenon, standing waves exist in the sleeve so that, initially, it can be said that the ring and the structure attached thereto do not take energy out of the vibrating system. In addition, since the length of the sleeve is preferably adjusted to a quarter wavelength, and a phase reversal occurs at said large mass, reflected waves arrive back at the originating point in phase so that the sleeve is free of stresses, particularly at the junction of the sleeve and the vibratory element, which would ordinarily occur if an out-of-phase condition existed.

Other and further advantages of the invention will become apparent from the description of a particular embodiment, which follows, when taken in conjunction with the accompanying drawing wherein:

Fig. 1 is a side elevational view illustrating an embodiment of the invention; and Fig. 2 is an exploded isometric view of the device shown in Fig. 1 with a portion thereof cut away.

Referring now to Figs. 1 and 2, the vibratory system 10 of the device is shown comprised of a longitudinal vibratory element for the transmitting cone 11 which is driven by a magnetostrictive driver 12. The driver 12 may be a conventional type comprised of nickel laminations 13 and is energized by connecting the terminals 14 and 15 of a winding 16 attached thereto to a suitable direct current and alternating current of the proper frequency (not shown). The driver 12 operates at its natural resonate frequency and sets the vibratory element 11 into vibration. Said driver may have a length substantially equal to one-half a wavelength of the oscillations of the operating frequency, while the vibratory element may be any integral number of half wavelengths long and is intended herein to be substantially one-half wavelength. An antinode exists in this vibratory system at the region 17 where the driver is soldered, by any suitable means such as silver solder, to the vibratory element, and an antinode exists at the region 18. A node exists in this vibratory system in the region 19 of the vibratory element.

A comparatively thin cylindrical sleeve 20, having a length which is substantially equal to one-quarter wavelength or odd integral multiples thereof of the operation frequency of the device, may also be silver soldered to the vibratory element in the region 19 of the node. Lengths other than a one-quarter wavelength or odd multiple integral wavelength may be used in systems wherein the amplitude of radial vibrations at the longitudinal node is substantially negligible for reasons to be given in a subsequent paragraph. A large massive ring 21 is connected to the other end of the sleeve, which mass may also be attached by means of silver solder. Openings 22, 23 and 24 in the ring are provided for attaching a housing 25 to the ring, and an opening 26 is provided for attaching the terminals 14 and 15 to the proper supply sources. An inlet 27 is provided in the top of the housing 25 for supplying a coolant fluid to the tube 28, which is attached to the interior portion of the housing, as shown best in Fig. 2. Openings in the tube allow the coolant to flow over the vibratory system to remove heat as the coolant leaves housing via an outlet 29 in said ring. Openings 30, 31 and 32 in the base of the housing are provided to mate with the openings 22, 23 (not shown in the cutaway portion) and 24 and to be secured by suitable watertight hardware 24a and a gasket (not shown) when the housing is secured to the ring. The terminals of the winding extend through a watertight cap 33 secured to a pipe 34, in turn secured in the opening 26 of the ring. The watertight cap and pipe prevent the coolant from leaking out through the opening.

When the vibratory system is set into vibration, the region 19, a node, is substantially free of longitudinal vibrations. Therefore, the end of the sleeve and the structure attached thereto are similarly free of longitudinal vibrations. However, the end of attachment of the sleeve to the vibratory element is subjected to radial vibrations occurring at the node.

Radial vibrations occurring at the node induce a radial wave front that travels the length of the sleeve 20. Said wave front strikes the large mass of the ring 21, is reversed in phase, and is reflected back to the point of origination. The larger mass of the ring in comparison to that of the sleeve can be likened to an infinite stiffness for reflecting the wave front impinging thereon. Thus, during a first cycle when maximum radial displacement occurs at the longitudinal node, the amplitude of the radial wave front is at a maximum, and the sleeve at the region 19 is correspondingly displaced to a maximum, while the end of the sleeve terminated at the ring is displaced to a minimum. The sleeve can be visualized as "bulging" during this portion of the cycle with the largest displacement in the vicinity of the region 19. However, because the length of the sleeve is substantially one-quarter wavelength, reflected waves arrive back at the region 19 at a maximum amplitude but are 180 degrees out of phase with respect to the initial wave but are in phase with the next cycle of radial vibrations, which characterize minimum displacement at the longitudinal node. Thus, the sleeve may be visualized as being "contracted" at the region 19. It follows, then, that during successive cycles the dimensions of the sleeve change with the displacement occurring at the longitudinal node, and the existence of standing waves between the region 19 and the ring 21 prevents stresses at the junction between vibrator element and the sleeve, and substantially no energy passes from the ring to the rest of the system. Furthermore, it is understood that the length of the sleeve can be selected to be other than a quarter wavelength or odd integral multiple thereof if the circumference of the vibrating element at the longitudinal node, and hence the sleeve, is a full wavelength or an integral multiple thereof. Under these circumstances, the displacement of the sleeve will similarly correspond to the displacement occurring at the longitudinal node, so that the length of the sleeve does not have to be one-quarter wavelength or odd integral multiple thereof.

An additional advantage of a rigid sleeve is exemplified by performing work on a body in a plane other than that normal to the tool. Whereas, in other vibrator devices, rubber or rubber-like members have been used as the compliant member, the sleeve in the present invention, work at other than normal planes with these devices is often precluded by unsatisfactory lateral movement.

The vibratory device may be mounted in any convenient manner and may be attached to a drill press in the manner described in the aforementioned patent to Calosi. The tapered end of the vibratory element may be threaded to accept, preferably, a tool or a toolholder to which a work tool is attached.

It is realized that various other modifications of the invention may be made without departing from the principals of the invention. It is, therefore, intended that the claims which follow shall not be limited to the details of the embodiment herein described and illustrated.

What is claimed is:

1. In combination, an elongated mechanical vibrator and means attached to one end thereof to set said vibrator into longitudinal oscillation, said vibrator having a length equal substantially to one or more integral half wavelengths of the vibrations therein and having antinodes at its ends and support means for said vibrator comprising, a substantially rigid cylinder attached to said vibrator in the vicinity of a node of the natural resonant frequency of said vibrator, said support means being of a length equal substantially to an odd integral number of quarter wavelengths of said natural resonant frequency.

2. In combination, an elongated mechanical vibrator and means attached to one end thereof to set said vibrator into longitudinal oscillation, said vibrator having a length equal substantially to one or more integral half wavelengths of the vibrations therein and having antinodes at its ends and support means for said vibrator comprising, a substantially rigid cylinder having an internal diameter smaller than the cross-section of said vibrator in the vicinity of a node of said vibrator and a length equal substantially to an odd number of quarter wavelengths therein of said vibrations telescopically enveloping said vibrator substantially at said node point at one end thereof, and a large mass attached to the other end of said cylinder.

3. In combination, an elongated mechanical vibrator and means attached to one end thereof to set said vibrator into longitudinal oscillation, said vibrator having a length substantially equal to one or more integral half wavelengths of the oscillations therein and antinodes at its ends and support means for said vibrator comprising, a cylinder having low sonic dissipation and having an internal diameter smaller than the cross-sectional diameter of said vibrator in the vicinity of a node of said vibrator and a length substantially equal to an odd number of quarter wavelengths therein of said vibrations telescopically enveloping said vibrator in the vicinity of said node at one end thereof, and a large mass attached to the other end of said cylinder.

4. In combination, a mechanical vibratory system comprising a vibration source, a tapered impedance transmission element coupled to said source, support means substantially an odd integral number of quarter wavelengths of said vibration source attached at one end thereof to said tapered element and responsive to radial vibrations in said tapered element at the region of attachment, a large mass terminating said support means for reflecting flexural waves occurring in said support, housing means including cooling means attached to said mass and enveloping a portion of said vibratory system, whereby the response of said support means and said mass to said transverse wave maintains said support means substantially rigid.

5. In combination, a mechanical vibratory system comprising a vibration source and a tapered impedance transmission element coupled to said source, having a substantially resonant operating frequency, substantially rigid support means attached at one end thereof to said system substantially at a node of said system for supporting said system, said support means having an internal diameter substantially larger than the outer diameter of said vibrator in the vicinity of a node and having a length substantially an odd integral number of quarter wavelengths of said vibration source, a large mass attached to the other end thereof, and housing means including cooling means for said vibration source attached to said mass and enveloping said vibratory system, whereby the response of said support means and said mass to transverse waves occurring therein at said node maintains said support means substantially rigid.

6. In combination, an elongated mechanical vibratory system, and support means for supporting said system enveloping a portion of said system and attached to said system substantially at a node of the natural resonant frequency of said system, said support having a circumference substantially equal to a wavelength or integral multiple thereof of said natural resonant frequency.

7. In combination, an elongated mechanical vibratory system, and support means for supporting said system enveloping a portion of said system and attached to said system substantially at a node of the natural resonant frequency of said system, said support having a circumference substantially equal to a wavelength or integral multiple thereof of said natural resonant frequency and any practical length.

8. In combination, an elongated mechanical vibrator and means attached to one end thereof to set said vibrator into longitudinal oscillation, said vibrator having a length equal substantially to one or more integral half wavelengths of the vibrations therein and having antinodes at its ends, a substantially rigid cylinder attached to said vibrator in the vicinity of a node of the natural resonant frequency of said vibrator, said support means having a circumference equal substantially to a wavelength of said natural resonant frequency.

9. In combination, an elongated mechanical vibrator and means attached to one end thereof to set said vibrator into longitudinal oscillation, said vibrator having a length equal substantially to one or more integral half wavelengths of the vibrations therein and having antinodes at its ends, a substantially rigid cylinder having an internal diameter smaller than the cross-section of said vibrator in the vicinity of a node of said vibrator and a circumference equal substantially to a wavelength therein of said vibrations telescopically enveloping said vibrator substantially at such node point at one end thereof, and a large mass attached to the other end of said cylinder.

10. In combination, an elongated mechanical vibrator and means attached to one end thereof to set said vibrator into longitudinal oscillation, said vibrator having a length substantially equal to one or more integral half wavelengths of the oscillations therein and antinodes at its ends, a cylinder having low sonic dissipation and having a circumference substantially equal to a wavelength of said vibrations therein telescopically enveloping said vibrator in the vicinity of said node at one end thereof, and a large mass attached to the other end of said cylinder.

11. In combination, a mechanical vibratory system including an elongated vibratory element and driving means attached to one end thereof, cylindrical support means having a circumference substantially equal to a wavelength attached at one end thereof to said element substantially at a node of the vibrations induced therein, a ring of large mass surrounding and displaced from said element attached to another end of said support means, housing means including a top and side wall means attached to said ring and forming with said support means an enclosure enveloping said driving means, means inside said housing means for cooling said vibratory system.

References Cited in the file of this patent

UNITED STATES PATENTS

| | | |
|---|---|---|
| 2,632,858 | Calosi | Mar. 24, 1953 |
| 2,651,148 | Carwile | Sept. 8, 1953 |